United States Patent [19]

Wyatt

[11] 3,911,983
[45] Oct. 14, 1975

[54] AIRPLANE SUMP DRAIN APPARATUS

[76] Inventor: Ronnie D. Wyatt, 3408 Thomas, Midland, Tex. 79701

[22] Filed: May 2, 1974

[21] Appl. No.: 466,486

[52] U.S. Cl............... 145/50 A; 145/50 B; 81/90 D
[51] Int. Cl.² ..................... B25B 15/00; B25B 13/48
[58] Field of Search ............ 81/3.1 B, 3.1 D, 90 R, 81/90 B, 90 D, 119; 145/50 A, 50 B, 50 R, 78

[56] References Cited
UNITED STATES PATENTS

| | | | |
|---|---|---|---|
| 188,243 | 3/1877 | Gold | 81/119 X |
| 3,014,389 | 12/1961 | O'Hara | 81/90 D |

Primary Examiner—Al Lawrence Smith
Assistant Examiner—James G. Smith
Attorney, Agent, or Firm—Marcus L. Bates

[57] ABSTRACT

Aircraft sump drain tool for manipulating a drain sump valve and catching a fuel sample. A handle attached to and underlying an upwardly opening cup member is affixed to an upwardly extending lever, with the handle, cup, and lever being axially aligned with one another. A gas cock engaging means is attached to a free end portion of the lever and engages and opens the drain cock of a sump drain to thereby enable fuel to flow into the interior of the cup for examination and disposal thereof.

7 Claims, 3 Drawing Figures

AIRPLANE SUMP DRAIN APPARATUS

BACKGROUND OF THE INVENTION

One of the duties of a pilot or a mechanic when preflighting an aircraft is to drain the fuel sump prior to each flight and after each refueling stop, so as to remove debris and water which may accumulate therein. Some aircraft have several fuel sumps, each of which should be drained in order to carry out a proper preflight inspection of the aircraft.

Fuel sumps and the drains connected thereto inevitably are placed in a crowded location respective of the aircraft. It has heretofore been customary for one to engage the fuel cock with the fingers so as to open the cock and drain a portion of the contents of the sump therefrom. The awkward position of one's anatomy during this operation causes the outflow of fuel to saturate one's hand and to run down the forearm to the elbow, where the fuel then usually drips onto the ground. This sequence of events stains one's clothing, and additionally contaminates the skin with tetraethyl lead compounds. Furthermore, analysis of the foreign matter contained within the drained fuel is not possible under these conditions.

Accordingly, it is desirable to have an aircraft sump drain tool which includes means associated therewith for engaging a drain cock of a fuel sump, and means for holding liquid drained therefrom so that one can easily and safely manipulate the valve of a sump drain while at the same time collecting fuel which flows therefrom so that the fuel can be subsequently analyzed for foreign matter which may inadvertently be contained therein.

SUMMARY OF THE INVENTION

An aircraft sump drain tool having an upwardly opening cup member for containing fuel placed therein. A handle underlies and supports the cup member. Opposed to the handle is an upwardly extending lever having a fuel cock engaging means attached to a free end portion thereof so that the handle can be used to manipulate the tool into engagement with a sump drain cock, whereupon opening of the fuel cock enables the outflow to be captured within the cup member, thereby enabling visual analysis thereof for foreign matter or material.

The handle, cup, and lever preferably are axially aligned with one another. The fuel cock engaging means can be readily exchanged for another of different design to enable the tool to be used for various different type fuel cocks.

A screwdriver attached to a lower free end portion of the handle can be used for unfastening portions of the cowling of the aircraft, as may be required for admittance into proximity of the sump drain.

A primary object of the present invention is the provision of a sump drain tool which enables the drain cock on an aircraft to be opened, a sample of fuel withdrawn therefrom, the drain cock closed, and the fuel retained for subsequent analysis.

Another object of the invention is to provide an aircraft sump drain tool for manipulating a sump drain cock and for obtaining a sample of fuel therefrom for subsequent analysis.

A further object of this invention is to disclose and provide a hand held aircraft sump drain tool which enables a sample of fuel to be withdrawn from the fuel sump drain apparatus of an aircraft.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENTS

Figure 1:
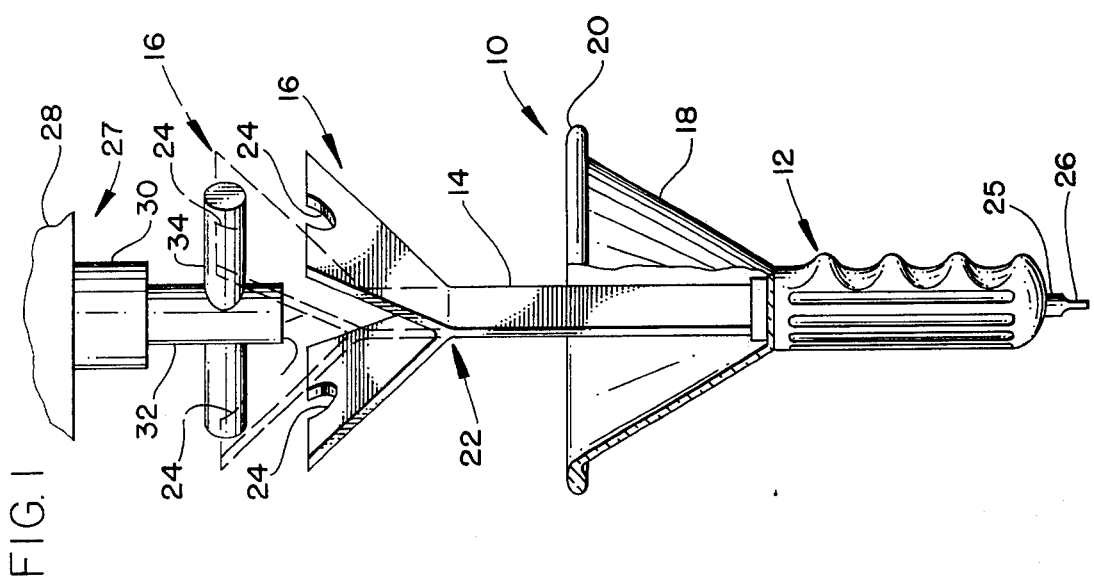
FIG. 1 is a broken, side elevational view of a sump drain tool made in accordance with the present invention, and shown in operative relationship with an aircraft sump and drain cock.

In FIG. 1 there is disclosed an aircraft sump drain tool broadly indicated by the arrow at numeral 10. The tool comprises a handle 12 in the form of a pistol grip from which there upwardly depends in axially aligned relationship therewith a vertically disposed upwardly extending member 14. A drain cock manipulator 16 is affixed to the free end portion of the lever.

A cup 18 in the form of an inverted frusto cone is axially aligned with the lever and the handle. The cup has a reinforced rim portion 20 and is fabricated of a material which is compatible with aircraft fuel.

The manipulator of the first embodiment preferably is a bifurcation formed in the marginal end of the lever so that the resultant angular disposed ears diverge from one another in an upward direction with the marginal ends thereof being provided with a cutout 24.

Affixed to the handle in opposed relationship to the lever is a screwdriver 25 having the usual flat screw head engaging member 26. The screwdriver preferably is of a size which can be conveniently used to actuate Dzus (TM) fasteners and the like generally associated with aircraft.

A gas sump 27 affixed to a gas tank 28 is provided with the usual gas cock which is in the form of a valve body 30 having the usual valve element 32. The valve element is spring loaded and moved by means of a lateral pin 34. When the lateral pin 34 is moved toward the valve body 30, fuel flows from the tank, through the sump and cock, and out of the outlet thereof.

Throughout the remaining figures of the drawings, wherever logical or expedient to do so, like or similar numerals will refer to like or similar objects.

Figure 2:
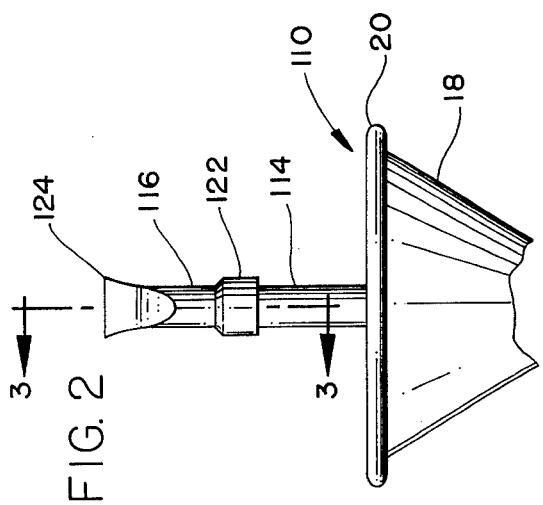
FIG. 2 is a fragmentary, side elevational view of a modification of the apparatus disclosed in FIG. 1.
Figure 3:
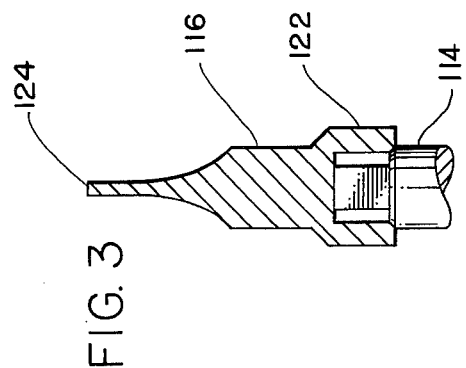
FIG. 3 is a fragmentary, part cross-sectional view taken along line 3—3 of FIG. 2.

In the second embodiment illustrated in FIGS. 2 and 3, the upwardly extending member 114 is affixed to the cup and handle as in the before described manner of FIG. 1. The manipulator 116 enlarges at 122 and is made into the configuration of a female socket which receives the complimentary marginal depending end portion of the upwardly extending member 114 in the manner of a common box socket wrench set.

The drain cock engaging means 124 is in the form of a screwdriver blade for manipulating drain cocks such as found on modern aircraft exemplified by the Mooney MU-2.

As seen illustrated in FIGS. 2 and 3 of the drawings, the screwdriver or manipulator 116 can be removed at 122 from the upwardly extending member 114 so that one manipulator can be exchanged for another.

OPERATION

In operation, the tool of the present invention is grasped by the handle 12 with the fingers freely engaging the pistol grip provided thereon. Any fastener means which must be actuated in order to gain access to the drain cock is conveniently engaged and moved by means of the screwdriver 26. Upon gaining access to the sump, the lateral bar 34 of the cock is engaged by the opposed cutouts 24, thereby moving spring loaded member 32 into the valve body 30 whereupon fuel flows through outlet and into the inverted cup.

The cup is maintained in the vertical position and moved to a more convenient location where the contents thereof can be carefully inspected for foreign matter.

Where deemed desirable, the cup can be made of clear plastic material so that any accumulation of water therein will be clearly distinguished from any fuel contained therein.

The screwdriver 25 can be made removable respective to the handle 12 in the manner of the screwdriver 116 of FIG. 2 so that the screwdriver and each of the manipulators can be freely interchanged, one for the other, when it is deemed desirable to do so, thereby enabling Dzus (TM) fasteners to be manipulated as well as both types of drain cocks.

I claim:

1. Aircraft sump drain tool comprising an upwardly opening cup member for containing fuel therein;
    a handle underlying and supporting said cup member; means by which the cup member is rigidly affixed to the handle;
    an upwardly extending member, said upwardly extending member being affixed to said cup and having a gas cock engaging means attached to the free end portion thereof so that said gas cock engaging means can move a gas cock of an airplane sump to the open position while fuel flows therefrom and into said cup;
    said gas cock engaging means being in the form of a screwdriver.

2. The aircraft sump drain tool of claim 1 wherein said upwardly extending member is axially aligned with said cup and said handle.

3. The aircraft sump drain tool of claim 2 wherein said handle is an extension of said upwardly extending member.

4. The aircraft sump drain tool of claim 1 and further including a screwdriver affixed to said handle, said screwdriver being axially aligned and opposed to said cup member.

5. The aircraft sump drain of claim 1 and further including a screwdriver affixed to said handle, said screwdriver being axially aligned and opposed to said upwardly extending member.

6. The aircraft sump drain tool of claim 1 wherein said cup member is in the form of an inverted frusto cone, said upwardly extending member being an extension of said handle and being axially aligned with said handle and cup member;
    a screwdriver removably affixed to said handle in opposed relationship to said upwardly extending member.

7. The aircraft sump drain tool of claim 1 wherein said screwdriver is removably affixed to said upwardly extending member in opposed relationship to said handle.

* * * * *